Aug. 13, 1963  H. G. SHAPIRO  3,100,601
AIRCRAFT TRAFFIC PATTERN AND RUNWAY COMPUTER
Filed Dec. 21, 1960  3 Sheets-Sheet 1
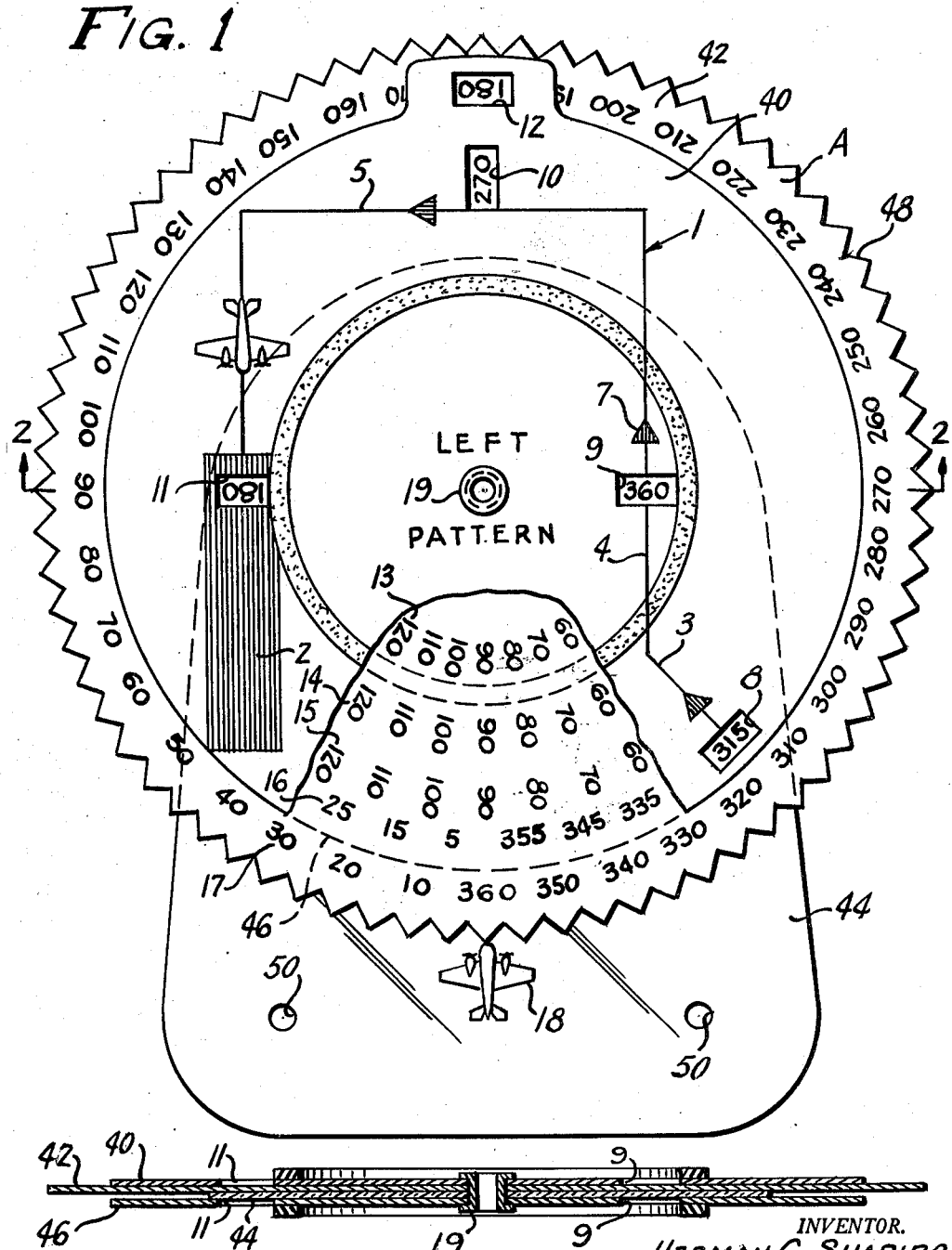
INVENTOR.
HERMAN G. SHAPIRO
BY
Kimmel & Crowell
ATTORNEYS.

Aug. 13, 1963   H. G. SHAPIRO   3,100,601
AIRCRAFT TRAFFIC PATTERN AND RUNWAY COMPUTER
Filed Dec. 21, 1960   3 Sheets-Sheet 3

INVENTOR.
HERMAN G. SHAPIRO
BY
Kimmel & Crowell
ATTORNEYS.

United States Patent Office 3,100,601
Patented Aug. 13, 1963

3,100,601
AIRCRAFT TRAFFIC PATTERN AND RUNWAY COMPUTER
Herman G. Shapiro, 721 Fernmere Ave., Interlaken, N.J.
Filed Dec. 21, 1960, Ser. No. 77,325
5 Claims. (Cl. 235—61)

The present invention generally relates to a hand manipulated computer for use by a pilot as an aircraft approaches an airport, and it is the primary object of the invention to provide the pilot with helpful information that will assist him in making a proper landing.

An object of the present invention is to provide a computer that will give a visual relationship between the heading of his aircraft and of the standard left hand and right hand traffic patterns headings.

Another object of the invention is to provide a computer for affording the pilot a visual relationship between the path of flight of his aircraft and the position of the runway on which he has been instructed to land by the control tower.

Another important object of the present invention is to provide a computer of the character described that will immediately indicate the headings of the traffic pattern for assigned landing runway, and which also is easy to manipulate, easy to understand and quite inexpensive to manufacture.

A further object of the computer of this invention is to provide a visual relationship of the airplane to the take-off runway while on the ground.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the computer with portions thereof broken away;

FIGURE 2 is a transverse sectional view taken substantially upon a plane passing along section line 2—2 of FIG. 1 and illustrating the relationship of the component parts of the invention;

Figure 3:
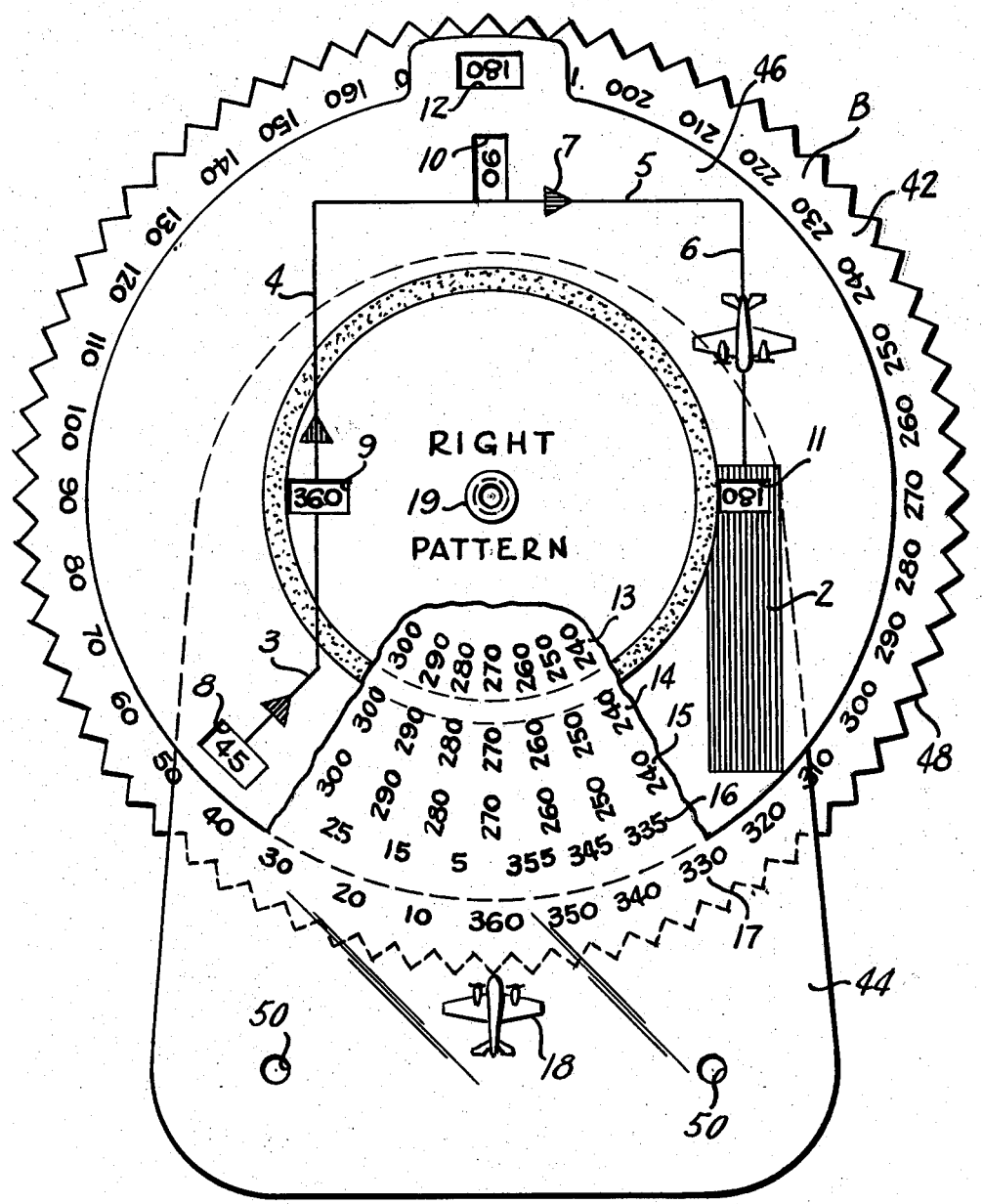
FIGURE 3 is a plan view similar to FIG. 1 but illustrating the other side thereof.

Referring now specifically to the drawings, the computer of the present invention includes a disc 40 which is a circular disc which has a sketch of a left hand traffic pattern 1 and a sketch of a runway 2. The sketch of the traffic pattern shows the pilot the four legs (compass headings) that he must follow before landing his plane on the runway 2; namely, entrance leg 3, downwind leg 4, base leg 5, and final approach leg 6.

Arrows 7 show you the direction of flight. There are five slots. In the first slot 8 is where the entrance leg heading into the pattern appears when the calculator is assembled. The next slot 9 is where the downwind leg heading appears. The next slot 10 is where the base leg heading appears. The next slot 11 is where the final approach leg appears. The last and outermost slot 12 is where runway heading is placed when tower provides number of landing runway. The purpose of slot 12 is to permit more rapid location of the runway heading. When the runway heading is placed in slot 12, it simultaneously appears on runway slot 11.

The disc 42 has five concentric circles of 36 calibrations on each. The innermost and smallest circle 13 contains headings for the downwind leg. The next circle 14 proceeding toward toward the outside contains headings for the final approach leg. The next circle 15 contains headings for the base leg; the next circle 16 contains headings for the 45 degree entrance leg and the outside 17 contains headings for the compass heading of the airplane and the heading of the landing runway.

Disc 42 uses both sides. Side A has headings for a standard left hand traffic pattern. Side B has headings for a standard right hand traffic pattern.

Since runway headings are given to the closest 10 degrees there are only 36 runway headings. Therefore, there are 36 traffic patterns for left hand traffic and 36 headings for right hand traffic patterns, or a total of 72 traffic patterns, the maximum number possible.

Plate 44 is the part of the invention which is held in the pilot's hand. It has a picture of an airplane 18 to denote the airplane the pilot is flying. When attached, the outer disc 42 is turned to the compass heading of the airplane 18 using the nose of the plane 18 as the marker. Plate 44 is held stationary while disc 42 is turned. Plate 44 is transparent plastic except for the airplane. There is a hole for the grommet 19. The reason for transparent plastic is to eliminate two discs for disc 42 when one disc printed on both sides will suffice.

The remaining circular disc 46 has a sketch of a right hand 1 traffic pattern and a sketch of a runway 2. The sketch of the traffic pattern shows the pilot the four legs (compass headings) that he must follow before landing his plane on the runway, namely; entrance leg 3, downwind leg 4, base leg 5, and final approach 6.

Arrows 7 show the direction of flight. There are five slots. The first slot 8 is where the entrance heading into the pattern appears when the calculator is put together. The next slot 9 is where the downwind heading appears. The next slot 10 is where the base leg appears. The next slot 11 is where the final approach leg heading (same as runway heading) appears.

The last and outermost slot 12 is where runway heading is placed when tower provides number of landing runway. The purpose of 12 is to permit more rapid location of the runway heading on disc 42 since all headings are visible on 17 of disc 42. When the runway heading is placed in slot 12 it simultaneously appears on runway slot 11.

This construction quickly provides data needed by aircraft pilots when entering an airport zone for a landing, such as, a visual relationship of the plane's heading with the heading of the runway on which he is instructed to land. Of the several runways in different directions, the one parallel to the runway on the invention will be the correct landing runway, the traffic pattern with the exact heading to fly on each leg also being clearly indicated.

Another object of this invention is to provide taxi directions to the take-off runway.

Another object is to provide the above data without mistakes that occur when such calculations are made by mental arithmetic.

Another object is to provide automatic data which leaves the pilot free to concentrate his mental and physical attention on landing his plane safely.

Another object of the invention is to avoid dependence on the memory of the pilot to retain the several headings as they are used one at a time.

Another object is to provide in two seconds information that would otherwise take minutes.

Another object is to provide this information before the pilot enters the hazardous traffic zone and before he is mentally and physically busy with the airplane mechanical preparations for landing.

This device can be constructed of various materials capable of being printed, such as plastic, aluminum or cardboard. It can be made pocket-size or any other size desired. The pocket size is designed for one-hand operation. The weight need be but 2 ounces.

When approaching an airport for a landing the pilot contacts the control tower by radio and asks for landing instructions. The tower answers by giving him the direction of the landing runway and other data. Before calling the tower the pilot sets his plane's compass heading on the computer, while holding plate 44 in his hand he turns disc 42 to his plane's heading. When the tower gives the pilot the landing runway the pilot sets this on the computer by revolving disc 40 or 46 so that runway heading also from circle 17 on disc 42 appears in slot 12.

By the two turns of the computer mentioned this invention provides immediate reference to the proper runway and all of the headings to fly in the traffic pattern. For example: (using a left hand traffic pattern which is the case 90% of the time).

The pilot comes in sight of the airport. He places the compass heading he is flying, 210 degrees, on his computer. This is done by turning outer wheel, circle 17 of disc 42 to 210 degrees opposite airplane 18 of plate 44. The pilot then calls for landing instructions and is told to land on runway 120 degrees (called runway 12 in aviation parlance—last zero omitted).

The pilot revolves disc 40 so that 120 degrees appears in slot 12. The same 120 degrees appears simultaneously in the picture of the runway slot 11. Also simultaneously all of the four traffic headings appear in their slots.

In the example given, the number appearing in slot 8 would be 255 degrees; in slot 9, 300 degrees; in slot 10, 210 degrees, and in slot 11, 120 degrees.

Looking at the airplane 18 you can see the angle of the path of of the airplane in relation to runway 2. In this manner you can pick out visually the landing runway on the ground. You look for the runway intersected by your plane's heading at the angle shown on the runway-plane relationship on this computer.

In the example given the plane intersects the runway at a perpendicular angle. Therefore, the runway on the ground will do the same and thus can be easily sighted.

Since most busy airports have several runways heading in various directions it becomes a problem determining the correct one on which to land. Many pilots fly over the airport and read the runway headings painted on the runways. This is not a safe procedure since this area is where traffic is heaviest, and this procedure is wasteful in that often the pilot has to fly back where he was to enter the traffic pattern, whereby with the aid of this invention he will know his path of flight immediately before entering the airport area.

The majority of small airports do not have a radio control tower or runway headings painted on the runways. The pilot knows on which runway to land by the direction of the wind sock or wind T. The pilot first sets compass heading on disc 42 opposite airplane 18 on the computer. The pilot turns disc 40 or 46 (left pattern or right pattern) to set runway 2 parallel to actual runway and then flies the headings of the traffic pattern as they appear on the computer.

By the use of this invention the pilot has a record of the four traffic headings he must fly to comply with airport safety regulations. If the pilot were to figure his headings by mental arithmetic there would be several possible hazards, namely: errors in mathematics, divided concentration between mental arithmetic and manual control of the airplane, the possibility of forgetting the figures, and the much greater time needed to figure.

To facilitate handling and rotation, disc 42 is provided with peripheral notches 48 forming serrations. Also, plate 44 is provided with apertures 50 for permanent screw mounting on the instrument panel of the airplane for the occasional pilot who will prefer this method to carrying the computer in his pocket.

Each disc 40 and 46 may have an annular ring 52 of rubber or similar material or indentations in the plastic or aluminum discs for aiding in manipulating the discs.

Figure 4:
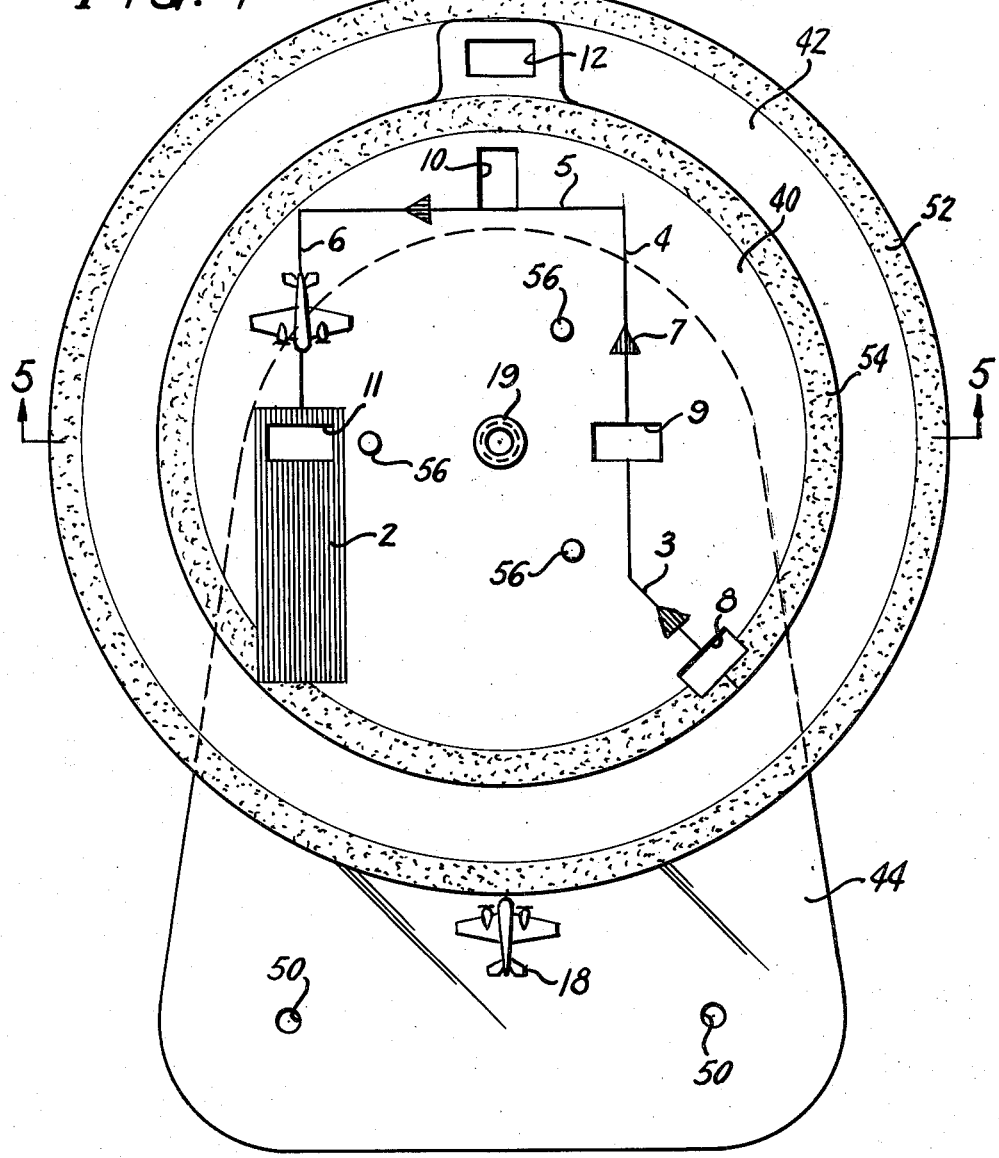
FIGURE 4 is a plan view of a modified form of the computer.
Figure 5:
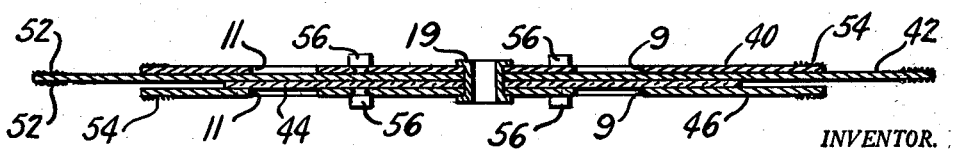
FIGURE 5 is a transverse sectional view taken substantially upon a plane passing along section line 5—5 of FIG. 4.

The structure illustrated in FIGS. 4 and 5 is substantially the same except that the edge of disc 42 is smooth and each surface has an annular ring 54 of sandpaper or the like attached thereto. The outer surface of discs 40 and 46 are also provided with an annular ring 56 of sandpaper or the like for assisting in the manipulation of the device. A plurality of spaced pins 56 are disposed on discs 40 and 46 and project therefrom. The foregoing is considered as illustrative only of the principles of the invention. Further, since numerous modifications and changes will readily occur to one skilled in the art, it is not desired to limit the invention to the exact construction and operation shown and described, and accordingly, all suitable modifications and equivalents may be resorted to, falling within the scope of the invention as claimed.

I claim:

1. A computer for use by pilots comprising a first circular disc, a plurality of spaced concentric rows of indicia on the surface of said disc, an outermost row of indicia being disposed adjacent the marginal edge of said first disc, a second disc mounted in overlying relation to the surface of said first circular disc and having a diameter less than the diameter of the circular disc, thereby revealing the major portion of the outermost row of indicia, said second disc including an aircraft traffic pattern thereon including the legs of the traffic pattern, direction arrows and a simulated runway, said second disc further including a projection extending radially outwardly from the marginal edge thereof in overlying relation to a portion of the outermost row of indicia on said first disc, portions of said projection defining a slot therein to reveal certain of the underlying indicia in the outermost row thereof, other portions of said second disc defining a plurality of circumferentially and radially spaced slots therein, certain of the indicia in each of said concentric rows thereof visible through certain of said slots to indicate the proper heading for each leg of the traffic pattern and the runway to be used, a plate forming a handle to which said first and second discs are rotatably connected, and a simulated airplane on said plate for registry with certain of the indicia on said first disc in the outermost row to provide a visual relationship of an aircraft to the legs of the traffic pattern and runway on said second disc.

2. The structure as defined in claim 1 wherein said first and second discs connected to said plate are rotatably interconnected at the center thereof, said plate having a width less than the diameter of the discs and being transparent whereby the indicia may be viewed therethrough.

3. The structure as defined in claim 1 wherein said first circular disc is provided with a serrated peripheral edge to facilitate moving the same, and the outer surface of said second disc includes a ring of resilient material adjacent the periphery thereof.

4. The structure as defined in claim 1 wherein the surface of said first circular disc and the outer surface of said second disc is provided with an annular area of friction increasing material.

5. A computer for providing flight path magnetic landing courses for aircraft and the like comprising: a pair of concentrically rotatable opaque discs, the first disc including: first 360° scale means concentrically disposed thereon for indicating runways, a plurality of additional concentric 360° scale means for indicating courses for an aircraft to be flown in preparation for landing; the second disc including alignment indicia, lines on said second disc designating flight path landing course legs, and a plurality of cooperatively positioned windows through said second disc along said lines and corresponding to said additional scale means to provide a view of those portions of said additional scale means designating landing pattern courses for the aircraft to be flown for landing the aircraft on the selected runway on said first scale means aligned with said alignment indicia.

References Cited in the file of this patent

UNITED STATES PATENTS

| | | |
|---|---|---|
| 748,924 | Buresh | Jan. 5, 1904 |
| 1,600,591 | Johnston | Sept. 21, 1926 |
| 1,844,564 | Davis | Feb. 9, 1932 |
| 2,328,881 | Saunders | Sept. 7, 1943 |
| 2,437,621 | Strate | Mar. 9, 1948 |
| 2,550,458 | Dresher | Apr. 24, 1951 |
| 2,727,686 | Thalman | Dec. 20, 1955 |
| 2,901,167 | Mudge | Aug. 25, 1959 |
| 2,953,298 | Peterkin | Sept. 20, 1960 |
| 2,996,242 | Bannister | Aug. 15, 1961 |